Nov. 20, 1951     S. W. ANDERSON     2,575,481
WIRE FASTENER
Filed March 30, 1946
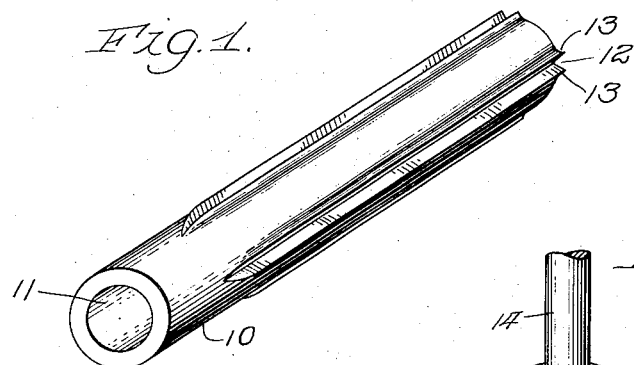
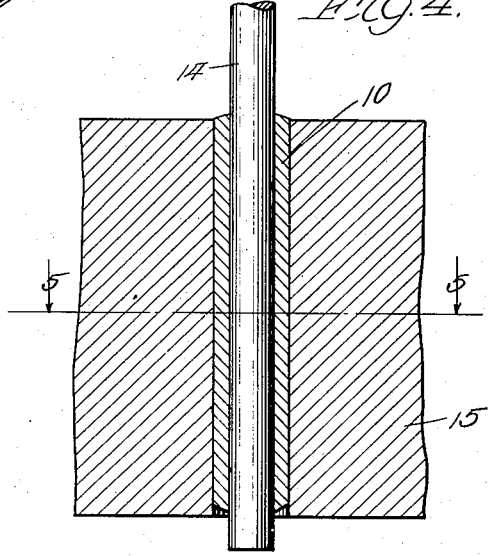
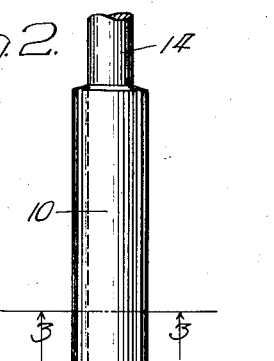
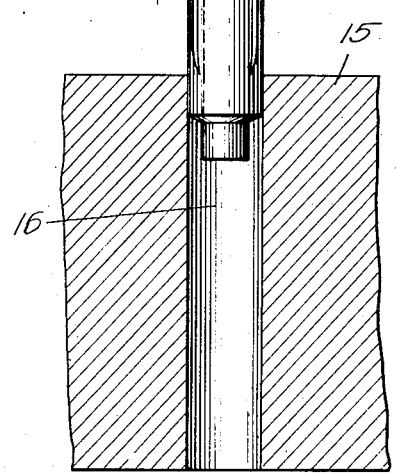
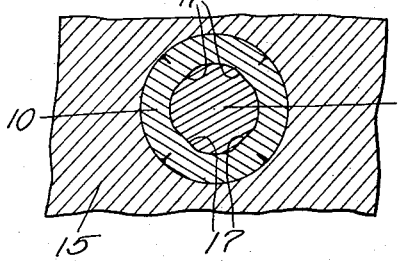
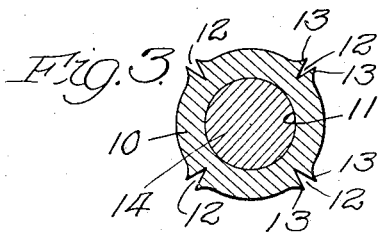
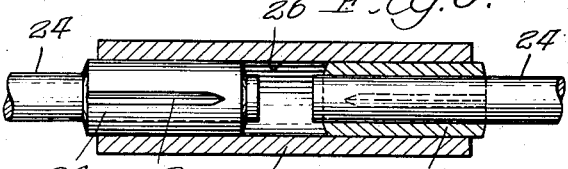
Inventor:
Stanley W. Anderson, Patented Nov. 20, 1951

2,575,481

UNITED STATES PATENT OFFICE 2,575,481

WIRE FASTENER

Stanley W. Anderson, Western Springs, Ill.

Application March 30, 1946, Serial No. 658,561

2 Claims. (Cl. 287—20)

The present invention relates to a wire fastener and more particularly to a device for permanently attaching the end of a wire to a member.

It is an object of the invention to provide a means that is simply and inexpensively constructed and which will securely anchor the end of a wire without the use of special tools or fusing substances, such as solder or the like. The invention is also adapted to secure other devices such as pins, studs or the like, to metal members or objects and to connect two wires or other similar objects together.

Other objects and advantages of the invention will appear from the following description taken in connection with the drawings in which:

Fig. 1 is a perspective view of an embodiment of my invention.

Fig. 2 is a fragmentary sectional view of a metal object, such as a motor plate, into which a fastener embodying my invention is partially inserted.

Fig. 3 is a sectional view taken on the line 3—3 of Fig. 2.

Fig. 4 is a sectional view similar to Fig. 2 but with the fastener fully inserted into the object.

Fig. 5 is a sectional view taken on the line 5—5 of Fig. 4.

Fig. 6 is a sectional view of an alternate construction of my invention showing two fasteners inserted in a tube for the purpose of connecting two wires together.

While I have illustrated in the drawing, and shall hereinafter describe in detail, two specific forms of the invention, it is to be understood that I do not intend to limit the invention to the particular forms or to the arrangements shown, it being contemplated that various changes may be made by those skilled in the art, without departing from the spirit and scope of the invention, as indicated by the appended claims.

In the embodiment of the invention shown in Figs. 1-5 of the drawings, 10 represents the fastener which comprises an elongated tubular member having a central bore 11 and four longitudinal surface grooves 12 extending from a point spaced from one end to the other end. The grooves are made in the surface of the cylinder in such manner that the material displaced when the grooves are cut is not removed but is pushed upward and outward as may be clearly seen from Fig. 3, thereby forming ridges 13 on each side of the grooves 12. The fasteners are preferably made of metal such as cold drawn steel and may be made in a plurality of sizes corresponding to the sizes of wire or other objects which are to be fastened by them.

In order to fasten a wire 14 to an engine plate 15, a fastener 10 is selected of which the bore 11 is of a size to snugly receive the wire 14 which is inserted into or through such bore from the grooved end. A hole 16 is then formed in the plate 15, such hole being of a size to snugly receive the ungrooved end of the fastener. The fastener is inserted manually until the ridges 12 contact the plate 15 and then force is applied to drive the fastener into the hole to the position shown in Fig. 4. Force may be applied by a large jawed wrench or other suitable tool, the amount of force needed being surprisingly small.

As the fastener is driven into the hole the ridges 12 are pressed downwardly and toward each other partially closing the grooves and causing the wall of the bore to collapse as shown at 17 and grip the wire or other object therein. The wall of the bore must therefore be of such thickness that it will collapse under such action. As a result of this insertion the wire will be so firmly gripped by the fastener and the fastener so firmly anchored in the hole that a force many times that exerted to insert the fastener is required to remove it. In fact, it will resist all usual forces acting upon the wire and will require substantially sufficient force to draw the wire before the wire or fastener can be removed.

In Fig. 6 is shown an alternate construction wherein the fasteners 20 are provided with but one groove 22 and each has an end of a wire 24 inserted into it from the grooved end. The ungrooved ends of the fasteners are then forced into the bore 26 of a tubular metal piece 25 and the wires are thereby coupled together.

The invention is not limited to any particular number of grooves in the fastener as any number can be made therein, depending upon the force expected to be applied against the wire. The wire and fasteners shown in the drawings are larger than those with which the invention will normally be used but the invention is capable of use with wires, pins, studs and the like of all sizes.

I claim:

1. A fastener for wire or the like comprising a tubular member adapted to receive a wire or the like snugly in its bore and provided with an elongated relatively narrow external surface groove providing a longitudinal weakened line along which the tubular member will collapse under radial pressure, said groove being at one end of the member, and integral ridges adjacent said groove on either side thereof consisting of the material forced from the member when making the groove.

2. A fastener for wire or the like comprising a tubular member adapted to receive a wire or the like in its bore and provided with an elongated relatively narrow surface groove, said groove being at one end of the member, and integral ridges adjacent said groove on either side thereof consisting of the material forced from the member when making the groove, such groove being of such depth that when the member is forced into an opening of substantially the same diameter as the ungrooved end of said member the interior wall of the member below said groove will collapse due to the pressure exerted against said wall by the ridges and will securely grip the wire.

STANLEY W. ANDERSON.

REFERENCES CITED

The following references are of record in the file of this patent:

UNITED STATES PATENTS

| Number | Name | Date |
|---|---|---|
| 1,443,383 | Reckleff et al. | Jan. 30, 1923 |
| 2,135,322 | Brantingson | Nov. 1, 1938 |
| 2,251,202 | Purtell | July 29, 1941 |

FOREIGN PATENTS

| Number | Country | Date |
|---|---|---|
| 646,016 | France | July 9, 1928 |
| 133,693 | Great Britain | Nov. 25, 1920 |